April 17, 1934.   O. U. ZERK   1,955,109
LUBRICATING APPARATUS
Filed Nov. 9, 1929   4 Sheets-Sheet 1
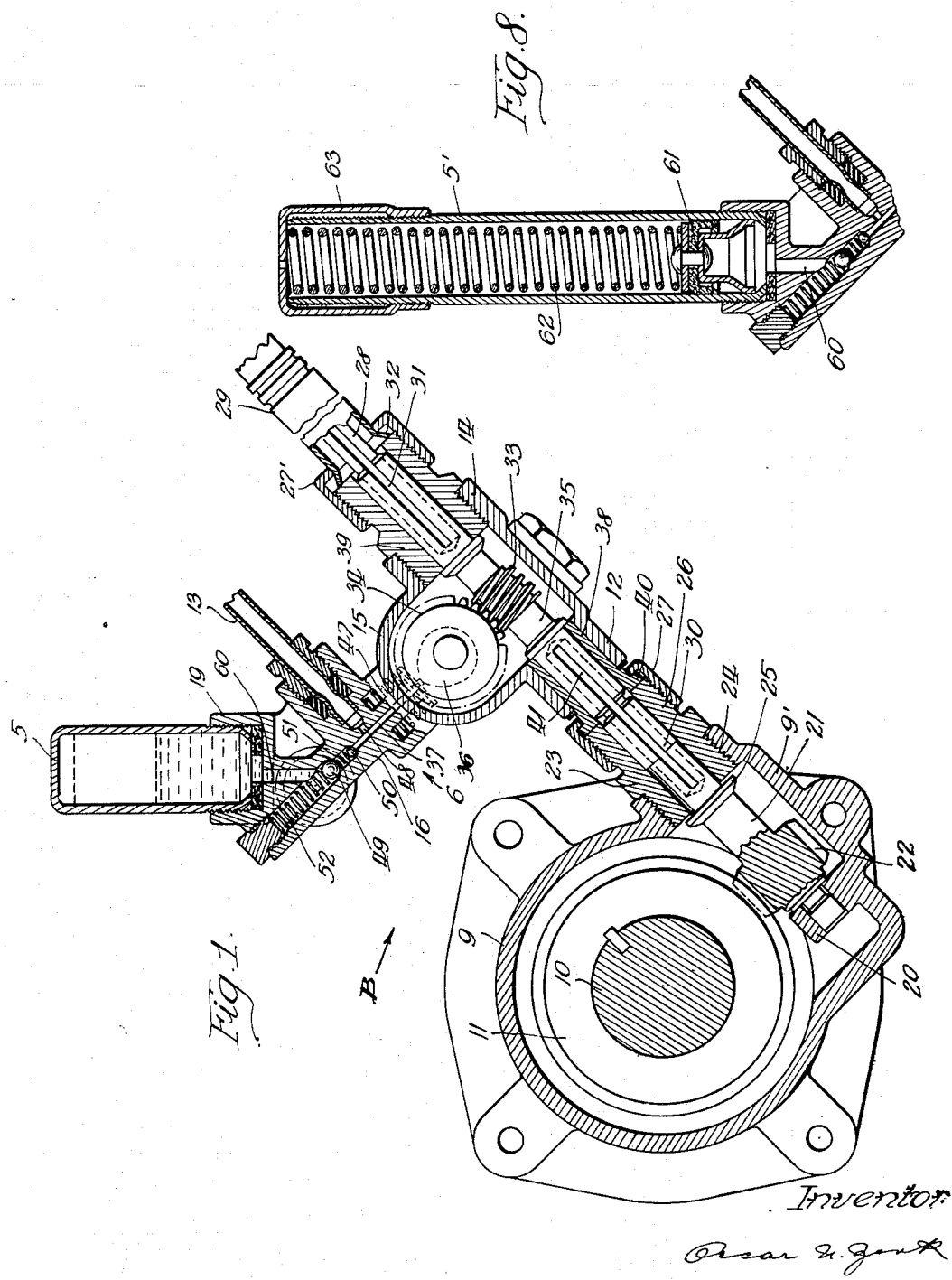

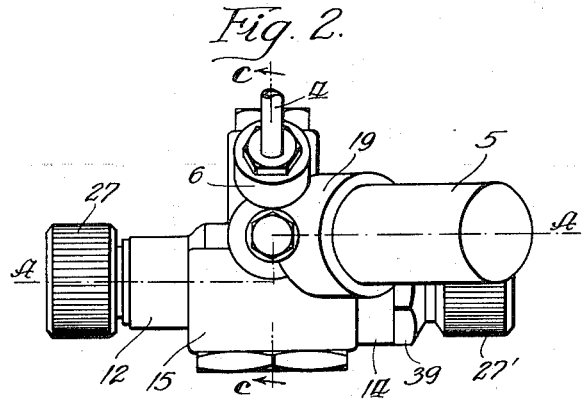
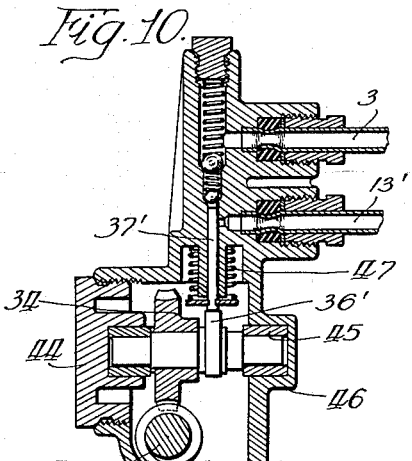
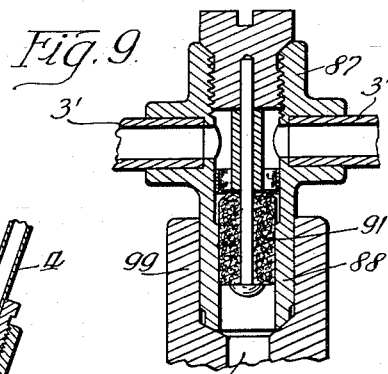
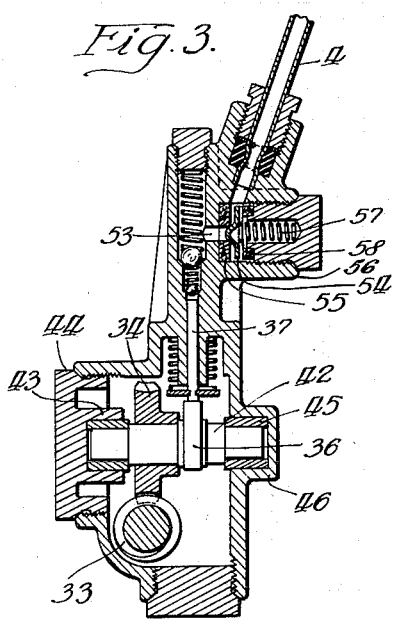
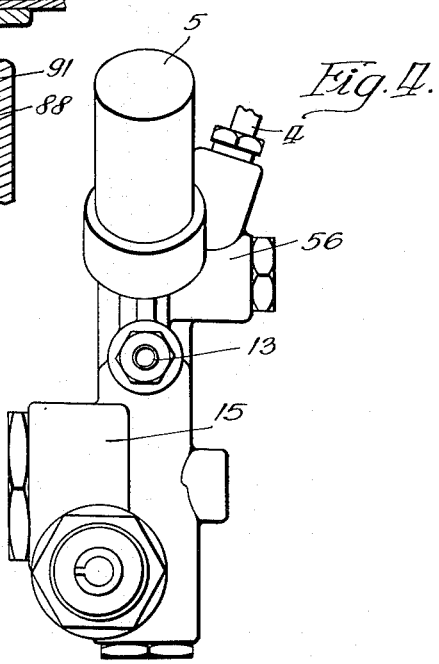

April 17, 1934.  O. U. ZERK  1,955,109
LUBRICATING APPARATUS
Filed Nov. 9, 1929   4 Sheets-Sheet 3
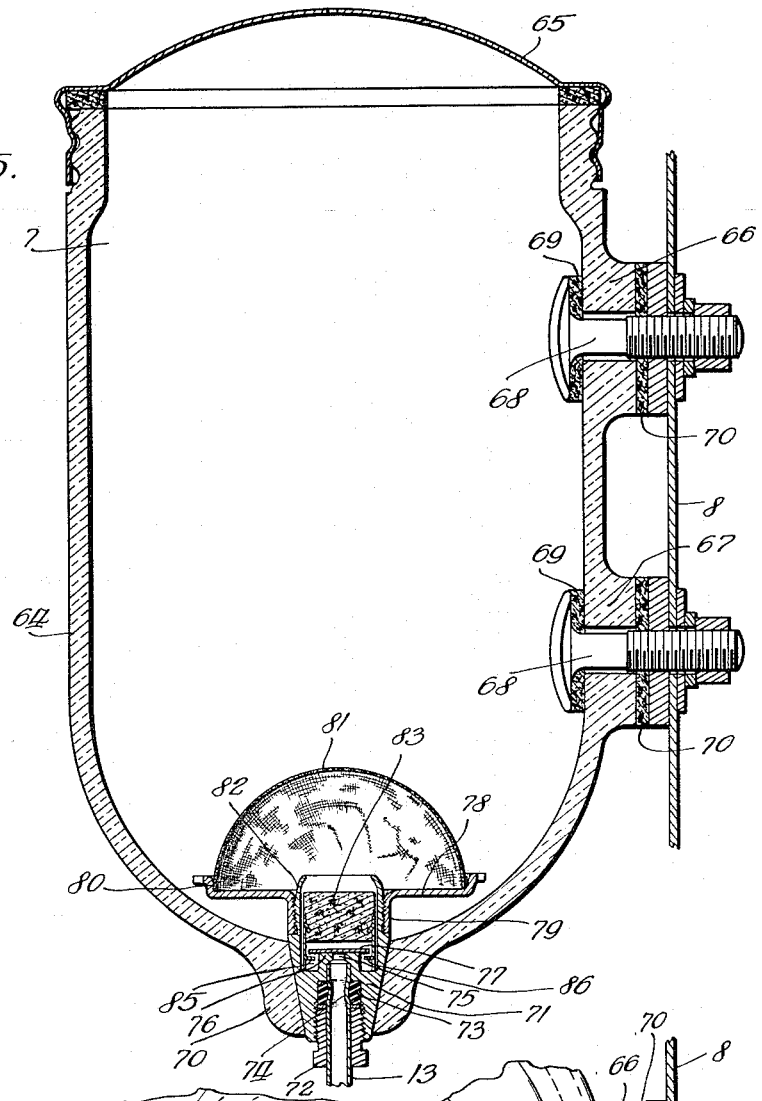

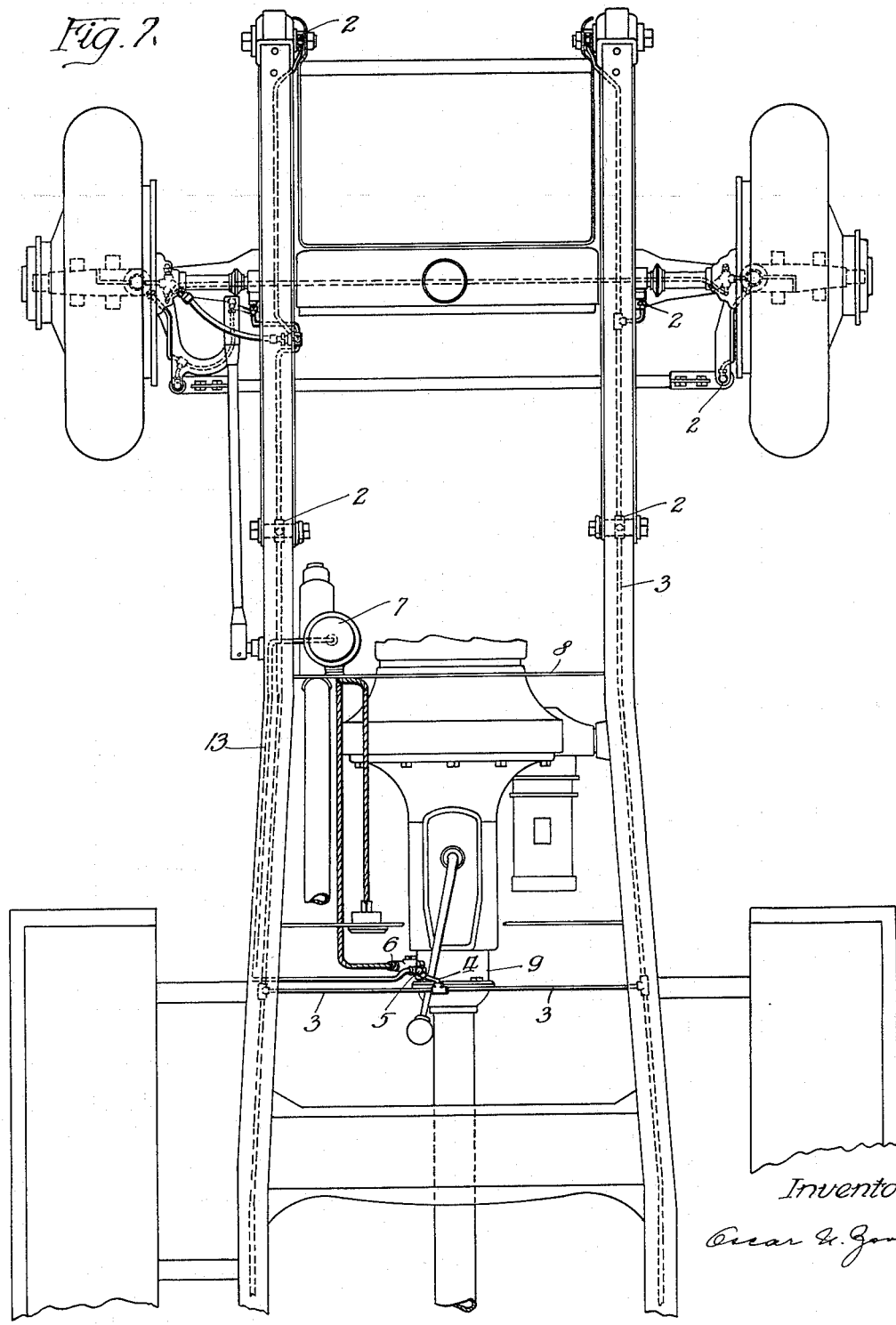

Patented Apr. 17, 1934

1,955,109

UNITED STATES PATENT OFFICE 1,955,109

LUBRICATING APPARATUS

Oscar U. Zerk, Chicago, Ill., assignor to Alemite Corporation, Chicago, Ill., a corporation of Delaware Application November 9, 1929, Serial No. 406,109

6 Claims. (Cl. 184—7)

My invention relates to lubricating apparatus and relates more particularly to lubricating apparatus which is specially adapted to effect periodic lubrication of a plurality of chassis bearings for an automobile, or the like, by lubricant conveyed by the apparatus, under pressure, to the bearings.

This invention relates to the pumping of lubricant, and the application of power to the pumping mechanism, in a centralized lubricating system. In the lubrication of the chassis bearings of an automobile from a common source, power for effecting the lubrication may be derived from at least five different sources:—

First, from movements of parts of the car resulting from road shocks when traveling over a road whose surface is not smooth;

Second, from pulsations of pressure exerted by gases exhausted from the engine, or by air admitted to the engine;

Third, from movements of liquids, such as the movements effected by the engine oil pump, or of water effected by the water pump of the engine cooling system;

Fourth, from electrical impulses; and

Fifth, from the running parts of the vehicle.

My invention relates to the last of the above mentioned sources of power supply.

Certain of the parts of an automobile engine operate at a very high rate of speed; for instance, the engine crank shaft is commonly rotated up to about 3,000 revolutions per minute while the cam shaft rotates up to about 6,000 revolutions per minute.

If lubricant pumping impulses were derived at the rate of one per sixty miles of travel, from the crank shaft, while turning at a speed of 3,000 revolutions per minute, or 180,000 revolutions per hour, a speed reduction ratio of 180,000 to 1 would be required, and if derived from the cam shaft turning at a speed of 6,000 revolutions per minute, or 360,000 revolutions per hour, a speed reduction of 360,000 to 1 would be required.

To accomplish such a great ratio of speed reduction between a crank shaft or cam shaft and the operating element of a lubricating pump, and to dispense, at one time, enough lubricant to lubricate all the chassis bearings of an automobile, would necessarily involve a very complicated and very costly speed reducing gear mechanism.

In my companion application, Serial No. 406,107 filed November 9, 1929, I have disclosed and claimed mechanism whereby an air pump is continuously operated during travel of an automotive vehicle, whereon the pump is installed, at the varying rates of travel of the vehicle, by virtue of the provision of a power take-off means detachably inserted between a relatively sturdy primary part of a speedometer drive mechanism and a relatively frangible part thereof. Air accumulatively compressed by the air pump is then periodically conveyed to a fluid pressure responsive motor which, in turn, effects operation of a lubricant pump, to supply lubricant from a common source to the different chassis bearings, through independent flow controlling bearing fittings.

In the present application a lubricant pump employing a piston of very small diameter, effects directly, the storage of lubricant under pressure which is progressively increased during the accumulative storage of the oil by the operation of said pump, the piston being preferably directly driven by apparatus, preferably including a cam from a primary relatively sturdy element of a speedometer driving mechanism.

In this manner, by the provision of suitable automatic means for periodically conveying the lubricant stored under pressure, after a predetermined pressure is exerted thereon, to the bearing elements, the bearings will receive periodically recurring "shots" of lubricant, one for a relatively large predetermined number of strokes of the pump piston.

At the same time by effecting reciprocation of the piston by an element of the speedometer driving mechanism the amount of lubricant stored under pressure, and the pressure accumulatively exerted on the lubricant, before each "shot" and incidentally the length of the periods between "shots" is proportional to the mileage travel of the vehicle, thereby effecting an economy in the use of lubricant, and, therefore, efficiency in the operation of the system.

Also, the use of the relatively expensive, complicated speed reducing gear mechanism required in prior systems where pumping impulses are derived from a rotatable element of the vehicle engine, is eliminated with a consequent reduction of gear noise and necessity for repair and replacement of parts.

A further economy is effected resulting from the fact that the mechanism of my invention, as above generally described, may be readily and cheaply installed adjacent the propeller shaft of the vehicle without requiring the extensive change of design in jigs, tools and equipment, for manufacturing an automobile engine, otherwise required in prior mechanisms.

An object of my invention, therefore, is to provide an improved lubricating mechanism for a vehicle for efficiency supplying lubricant to the vehicle chassis bearings.

Another object of my invention is to provide an improved lubricating mechanism for a vehicle for efficiently supplying lubricant to the vehicle chassis bearings through the use of relatively inexpensive pumping apparatus of a reliable type.

Another object of my invention is to provide an improved lubricating mechanism for a vehicle for efficiently supplying lubricant to the vehicle chassis bearings by power derived in a simple manner from an element of the vehicle running gear.

Another object of my invention is to provide an improved lubricating mechanism for a vehicle for efficiently supplying lubricant to the vehicle chassis bearings, in a manner involving the use of relatively noiseless driving mechanism, to supply lubricant in proportion to the rate of travel of the vehicle.

Another object of my invention is to provide an improved power take-off operable by a speedometer driving mechanism adapted to accumulatively effect storage of lubricant under conditions of progressively increased pressure for periodic discharge to flow controlled elements of vehicle classis bearings.

Another object of my invention is to provide an improved power take-off mechanism for a lubricant pump of a centralized lubricating system.

Other objects of my invention and the invention itself will be more apparent from the following description of certain embodiments of my invention, wherein reference is had to the accompanying drawings illustrating the said embodiments.

In the drawings:

Figure 1 illustrates in longitudinal medial sectional view, taken transversely of a propeller shaft and housing therefor, mechanisms embodying my invention;

Figure 2 is a plan view taken in the direction of the arrow B, Figure 1, of apparatus shown in Figure 1, in section taken on a stepped line A—A of Figure 2;

Figure 3 is a section taken on the line C—C of Figure 2;

Figure 4 is an end elevational view of the apparatus of Figure 2, viewed from the right end thereof;

Figure 5 illustrates a lubricant supply reservoir, in longitudinal medial sectional view;

Figure 6 is a plan view of the reservoir of Figure 5;

Figure 7 is a plan view of portions of an automobile chassis with the lubricating system employing the apparatus of the foregoing figures diagrammatically shown thereon;

Figure 8 is a view in longitudinal medial section of a pressure chamber for storage of lubricant adapted to be substituted for the corresponding chamber shown in Figures 1, 2 and 4.

Figure 9 is a longitudinal medial sectional view of a flow controlling outlet for the system of Figure 7.

Figure 10 is a longitudinal medial sectional view of a modified form of lubricant pump which may be employed in connection with mechanism embodying my invention, as otherwise shown in the preceding figures.

Referring now, first, more particularly to Figure 7, an automobile chassis is therein illustrated employing a plurality of chassis bearings at each of which a flow controlling outlet 2 is provided which may be of widely variant types, including metering units, resistance units, and the like. Figure 9 shows an outlet element which may be employed for this purpose.

The various outlets, such as 2 are interconnected by a conduit system comprising conduits 3 which radiate from a lubricant dispensing conduit 4 leading from a pressure chamber 5 in which lubricant is stored under pressure by an oil pump 6, which receives its supply of lubricant through a conduit 13 from an oil reservoir 7 preferably secured to the vehicle dashboard 8. At 9 a tubular casing section is shown for a vehicle propeller shaft 10, shown in Figure 1, which supports a worm gear 11 rigidly keyed thereto and rotatable therewith. The casing 9 is provided with a lateral extension 9', with an inwardly extending lug 20 thereof forming an end bearing for a pinion shaft 21 which supports a pinion 22 meshed with said worm gear.

The other end of the shaft 21 is journaled in a tubular fitting 23 screw threaded into the casing wall at 24, and is provided with an annular thrust element 25 to limit end-play movements of the shaft. The outer end 26 of the tubular fitting 23 is exteriorly threaded to receive a clamping nut 27.

In present day driving mechanism for flexible speedometer shafts, such as that whose splined end 28 is shown in Fig. 1, leading from the speedometer, not shown, through a flexible conduit 29 commonly is received within an end bore 30 of the shaft 21, its longitudinal spline 31 being received within a longitudinal groove of said pinion shaft bore, to effect driving of the shaft 28 by the pinion shaft.

In such a case a clamping nut 27' in the position of the similar nut 27, is employed to securely clamp the outwardly flared end 32 of the tubular end of the flexible conduit 29 against the end 26 of the fitting 23.

An object of my invention, heretofore recited, being to effect driving of the lubricant pump 6 by a power take-off mechanism adapted for interposition in the speedometer shaft driving mechanism, I preferably accomplish this in the manner illustrated, by providing as a unitary piece of apparatus, the pump 6, reservoir 5, the reduction gear mechanism comprising the worm gear 33 and pinion 34, which are installed on and within a casting forming a casing and support, and in which, moreover, certain valve mechanisms, subsequently described, are installed.

A driving shaft 35 extends longitudinally through the oppositely disposed aligned tubular bosses 12 and 14 of the casing portion 15 within which is received the eccentric cam element 36 for operating the pump piston 37. The ends of the shaft 35 are journaled within flanged bearing bushings 38 and 39 which are telescoped within the bosses 12 and 14, respectively, the first, by being driven in the boss 12, the second, by being screw threaded by a tubular end within the boss 14.

The ends of the shaft 35 contain longitudinal recesses having a longitudinally grooved lateral surface for the reception of splined ends of shafts, in a manner like that previously described for the splined shaft end 28 having the spline 31 projected into the longitudinally grooved recess 30 of the shaft 21.

A short section of rod 41 like that shown at 28 which constitutes the end of the speedometer shaft, is provided, having its end telescoped within the recess of that end of the shaft 25 journaled in the bushing 38. The bushing flange 40 is placed into abutting relation with the outer end of the fitting 23, and the clamping cap 27, previously placed in position over the bushing 38 between its flange 40 and the casing boss 12, is screw threaded onto the boss 26 of the fittings 23, the free end of the rod 41 being meanwhile telescoped into the longitudinally extending, longitudinally grooved recess 30 of the fittings 23.

In this manner the shaft 35 derives rotary motion from the shaft 21 through the connecting rod 41, by which and by means of the clamping nut 27 the shaft 35 is detachably joined to the pinion shaft 21.

In order to continue driving of the speedometer shaft by its end 28 from the shaft 21, the fitting 39, which is like the fitting 23 and incidentally forms a bearing for an end of the shaft 35 is exteriorly threaded to receive a clamping nut 27' substantially like that shown at 27 which securely clamps, the outwardly flared portion of the speedometer and casing conduit 29 against the end of the fitting 39, the splined rod 28 forming the terminal for the speedometer shaft being meanwhile telescoped into the longitudinally extending end recess of the end of the shaft 35, within said fitting 39, with the spline 31 received within the longitudinal groove of the recess wall.

The speedometer flexible driving shaft is, thereby detachably drawn to the end of the shaft 35 and rotary motion is transmitted thereby from the pinion shaft 21 independently of any functional effect of the worm pinion 33 on the shaft 35.

Extending transversely of the shaft 35 I provide a countershaft 42 journaled, respectively, at its ends in a reentrant portion 43 of a removable closure cap 44, and in a bushing snugly received within a wall recess 46 of the casing.

A pinion 34 and an eccentric cam element 36 are independently rigidly rotatably carried on the shaft 42, the pinion 34 meshing with the worm pinion 33 and driven thereby at a relatively reduced speed, the cam 36 engaging an end of the piston 37 to effect reciprocation thereof within the cylinder walls provided by the casing 16.

The helical spring 47 retracts the piston 37, being interposed between a wall of the casing 16 and a washer carried by the piston. Lubricant is conveyed to the pump cylinder through a lateral inlet opening 48 thereof from the oil reservoir 7 through the conduit 13, upon each retractive stroke of the piston which is effective to move the piston past the port 48 to restablish communication of oil therethrough.

The subsequently advancing piston 37 closes the port 48 and forces lubricant under pressure past the serially disposed valve balls 50 and 49 successively spring pressed to their seats by successively stronger springs 51 and 52.

The lubricant under pressure thereupon enters the closed pressure chamber 5, compressing air above the level of the oil as oil is progressively supplied to the chamber to progressively decrease the air volume with a consequent progressive increase in air pressure.

The valve balls 49 and 50 subsequently effect retention of oil under the effect of air pressure, upon retractive piston strokes. In Fig. 1 two liquid levels in the chamber are shown, one, roughly illustrating a condition under which the air exerts a pressure of fifteen pounds against the lubricant, and the other, wherein a pressure of one hundred pounds is exerted upon the lubricant by the air.

After the volumetric space occupied by the air is so decreased by displacement by oil in the chamber, the resulting fluid pressure exerted by the air on the oil acting through a duct 53 upon a small central surface portion of a differential valve disc element 54, seated against a valve seat provided by an annulus 55 in a valve chamber, provided by the tubular boss 56, is effective to unseat the valve 54 against the pressure of the spring 57 normally tending to hold it to its seat, and lubricant passing the valve port so opened will pass through the dispensing conduit 4 to the different fluid dispensing conduits 3, and thence to the bearings to be lubricated preferably through flow controlling outlets, which may be substantially as illustrated in Fig. 9, and which are more particularly described in my copending application Serial No. 406,110, filed November 29, 1929, to which reference may be had.

While these outlets may take various forms, preferably they comprise a tubular body 87 with which the dispensing conduit 3 communicates by inlet and outlet ducts 3' and 3'', secured by a tubular stem portion 88 within an element of bearing 99, which is provided with a bore 90 for conducting lubricant to the bearing surfaces.

One of said outlets is preferably provided for each bearing to be lubricated and the flow therethrough is controlled preferably by a flow controlling element 91, which may, as shown, comprise a plug of hard cork material, which is inwardly radially compressible responsive to the pressure of lubricant conveyed thereto through the duct 3' to permit a restricted flow past the outer surfaces of the plug to the bore 90 of the bearing element, and to reclose the passage to said bore when the pressure of lubricant is reduced.

The fluid under pressure passing the valve 54 will hold it open by pressure exerted on its entire face and seat it tightly against a second valve seat annulus 58, until by passage of oil introduce to the conduit system of the automobile and gradually dispensed through the outlets 2 from said conduits, the pressure exerted by the oil is so reduced that the pressure of the spring 57 overcomes the fluid pressure of lubricant exerted against the opposite face of the valve 54 to reseat it.

At this time the supply of oil in the compression chamber 5 will be reduced to a predetermined minimum.

An alternative embodiment of my invention comprises the apparatus illustrated in Figs. 1 to 7 inclusive, excepting that for the compression chamber 5, which is fluid tight except for the passage 60, through which lubricant is introduced and dispensed, the compression chamber 5' (Fig. 8) is substituted into which lubricant is pumped through the passage 60, as before, against the face of a piston 61 which is journaled for longitudinal reciprocation in the cylindrical walls of the chamber 5'.

Instead of air pressure accumulatively provided according to the amount of lubricant supplied, spring pressure is accumulatively provided for the chamber 5', by virtue of a compression spring 62 which resiliently resists movement of the piston 61 ahead of the body of lubricant forced into the chamber 5' through the passage 60.

Upon a predetermined amount of compression of the spring 62, the retractive force of the spring 62 exerted upon the lubricant through the piston 61 is effective to unseat the differential valve 54, in the manner as previously described for the first embodiment. During discharge of lubricant the piston 61 gradually is restored to its position, illustrated in Fig. 8, but the spring 62 is of such length that it is still compressed, having been precompressed by the placement of the cap 63 on the lateral walls of the chamber.

Referring now to Fig. 10, an alternative arrangement for the lubricant pumping mechanism is therein illustrated, in which a cylinder rod 37', forming a piston, is reciprocated in opposite directions by a cam 36', corresponding to the cam 36 of Fig. 1, and a spring 47, to pump lubricant received through a conduit 13' leading from the reservoir 7, directly to the dispensing conduits, such as 3, which lead to the dispensing outlets, which may be constructed generally similarly to that shown in Fig. 9.

The other parts of the pumping mechanism of Fig. 10 are generally like those shown in Fig. 1; the exception being that since no compression chamber, corresponding to that shown at 5, is employed, no differential valve, such as that shown at 54, is required.

In employing the arrangement shown in Fig. 10, without a lubricant compression chamber, care must be taken that the volume of lubricant pumped be not excessive.

Referring now to Figs. 5 and 6, the lubricant supply reservoir 7 is shown therein and may be made in the form of a glass bowl 64 having a cap 65 and bolted by thickened portions 66 and 67 to the dash 8 of the vehicle, substantially above the level of the pump 6, by bolts 68.

The portions 66 and 67 of the bowl are suitably cushioned by rubber washers 69 and 70, or the like. At the bottom of the bowl a tubular outlet 70 is provided having preferably a frusto-conical bore into which a tubular plug 71 is fitted. The plug 71 receives at one end the end of the lubricant conduit 13 which supplies lubricant to the pump 6, being fitted tightly in leakproof relation thereto by an annular plug 72 telescoped over the conduit 13 screw threaded into the bore of the plug 71 against a rubber or like annulus 73 interposed between the end of the annular plug 72 and a shoulder of the plug 71.

The lateral portions of the rubber annulus 73 being constrained by the lateral walls of the bore, longitudinal compression of the annulus 73 forces rubber material thereof inwardly to inwardly compress the copper lateral walls of the conduit 13, as shown at 74.

Therefore, the conduit 13 is tightly retained in the plug 71 and in leakproof communication with the valve passage 75 thereof.

The valve passage 75 is provided by the longitudinal bore of a reentrant tubular part 76 of the plug 71 projecting longitudinally thereof from an end wall of a recess at the inner end of the plug.

A disc of empire cloth 77, or like material, seated on the annular end of the tubular reentrant portion 76 of the plug element 71 is effective to close the passage 75 communicating with the conduit 13 in the normal positions of the apparatus shown under a condition wherein no oil is contained in the bowl 64.

At 78 I provide a disc having a central tubular flange 79 fitted onto the inner end of the plug 71 and supported thereby, and having an annular flange 80 at its rim portion within which a concavo-convex screen 81 is fitted, being preferably soldered by its edge thereto.

Within a relatively large tubular projection 82 of the plug 71 over which the tubular flange 79 is telescoped, I provide a float 83 of cork, or the like, loosely fitted therein, and which is adapted to rise therein when oil in substantial amount is contained within the reservoir 7. Inturned rim portions of the tubular extension 82 prevent the float 83 from moving from said tubular extension.

Upon the float 83 being elevated by its bouyancy when oil is contained in the reservoir, it will effect lifting of the valve disc 77 by pendant fingers such as 85 and 86 which engage the under surface of the disc adjacent its border which overhangs the reentrant tubular part 76. The fingers 85 and 86 preferably successively engage opposite sides of the disc to effect a more ready opening of the valve passage 75 previously closed by the disc. Said fingers may be provided in any suitable way, such as by providing finger extensions for a metallic tubular band encircling the lower end of the cork element 83, as illustrated.

Having thus described my invention in certain embodiments, I am aware that numerous and extensive departures may be made from the embodiments herein illustrated and described, but without departing from the spirit of my invention.

I claim:

1. In a centralized lubricating system, the combination of a speedometer shaft, a lubricant pump, a reservoir, a check valve between said pump and said reservoir, said pump adapted to progressively store lubricant in said reservoir under pressure accumulatively effected by said pump, means for releasing the stored lubricant to the system upon a predetermined pressure thereof, a driving shaft for said pump, said speedometer shaft comprising a primary sturdy and a secondary relatively frangible section, said pump shaft driven by said primary section.

2. In a centralized lubricating system, the combination of a speedometer shaft, a lubricant pump, a reservoir, a check valve between said pump and said reservoir, said pump adapted to progressively store lubricant in said reservoir under pressure accumulatively effected by said pump, means for releasing the stored lubricant to the system upon a predetermined pressure thereof, a pump shaft for actuating the pump, said speedometer shaft comprising driving and driven sections, said pump shaft interposed between said sections.

3. In a centralized lubricating system, the combination of a speedometer shaft, a lubricant pump, a reservoir, a check valve between said pump and said reservoir, said pump adapted to progressively store lubricant in said reservoir under pressure accumulatively effected by said pump, means for releasing the stored lubricant to the system upon a predetermined pressure thereof, a pump shaft for actuating the pump, said speedometer shaft comprising driving and driven sections, said pump shaft interposed between said sections, coupling elements at the ends of said pump shaft and at ends of said sections, adapted for interchangeable connections to interpose or to exclude said pump shaft intermediate the sections, to effect driving of the driven section by the driving section.

4. In a centralized lubricating system for an automotive vehicle, the combination of a lubricant pump, a lubricant supply reservoir therefor, a pressure chamber, dispensing conduits leading therefrom, said pump adapted to accumulatively pump lubricant from said reservoir into said chamber, resilient means in said chamber compressible by the accumulated lubricant received therein to exert progressively increased retractive pressure on the lubricant, a differential valve actuatable upon a predetermined high pressure of lubricant to dispense lubricant from the chamber to said dispensing conduits, flow controlling outlets for said conduits, said valve adapted to be retracted upon a predetermined low pressure of lubricant from the chamber, a speedometer shaft, and a pump shaft for the lubricant pump, one of said shafts operable by the other shaft.

5. In a lubricating system for an automobile vehicle, in combination with the running gear of the vehicle, a speedometer, a flexible shaft therefor, a primary driving element for said shaft, a lubricant pump, a shaft for operating said pump, said shaft provided at its ends with coupling elements, a coupling element for the driving end of the speedometer shaft, a coupling element for said primary driving element, said speedometer shaft coupling element adapted for driving engagement interchangeably with the primary element coupling element, and one of said pump shaft coupling elements.

6. In a centralized lubricating system for an automotive vehicle, the combination of a speedometer shaft, a lubricant pump, a shaft therefor, said speedometer shaft adapted to drive said pump shaft, means for effecting driving of the said speedometer shaft, a lubricant reservoir adapted to receive lubricant from said pump in progressively increased volume with accompanying progressively increased pressure exerted upon and by the lubricant, dispensing conduits leading from the reservoir, dispensing outlets for the conduits and flow controlling means in the outlets, and pressure responsive means to periodically conduct lubricant from the reservoir to the conduits.

OSCAR U. ZERK.